United States Patent
Waldron et al.

(10) Patent No.: US 9,354,399 B2
(45) Date of Patent: May 31, 2016

(54) OPTICAL FIBER CONNECTOR ASSEMBLY

(71) Applicant: Molex, LLC, Lisle, IL (US)

(72) Inventors: Mark R. Waldron, Poplar Grove, IL (US); Mark Matuszewski, Elmhurst, IL (US)

(73) Assignee: Molex, LLC, Lisle, IL (US)

( * ) Notice: Subject to any disclaimer, the term of this patent is extended or adjusted under 35 U.S.C. 154(b) by 213 days.

(21) Appl. No.: 13/953,891

(22) Filed: Jul. 30, 2013

(65) Prior Publication Data

US 2014/0044395 A1 Feb. 13, 2014

Related U.S. Application Data

(60) Provisional application No. 61/680,345, filed on Aug. 7, 2012.

(51) Int. Cl.
G02B 6/38 (2006.01)

(52) U.S. Cl.
CPC ............... *G02B 6/38* (2013.01); *G02B 6/3878* (2013.01); *G02B 6/3885* (2013.01); *G02B 6/3897* (2013.01); *G02B 6/3821* (2013.01)

(58) Field of Classification Search
CPC ...... G02B 6/38; G02B 6/3821; G02B 6/3878; G02B 6/3885; G02B 6/3897
USPC .......................................................... 385/60
See application file for complete search history.

(56) References Cited

U.S. PATENT DOCUMENTS

| 4,890,894 | A | * | 1/1990 | Kwa ................................. 385/56 |
| 5,138,679 | A | * | 8/1992 | Edwards et al. ................. 385/90 |
| 5,245,683 | A | * | 9/1993 | Belenkiy et al. ................ 385/72 |
| 5,909,526 | A | * | 6/1999 | Roth et al. ....................... 385/78 |
| 5,915,058 | A | * | 6/1999 | Clairardin et al. .............. 385/77 |
| 6,259,856 | B1 | * | 7/2001 | Shahid ........................... 385/147 |
| 6,361,218 | B1 | * | 3/2002 | Matasek et al. ................ 385/60 |
| 6,409,393 | B1 | * | 6/2002 | Grois et al. ..................... 385/78 |
| 6,505,976 | B1 | * | 1/2003 | Grois et al. ..................... 385/78 |
| 6,592,268 | B2 | * | 7/2003 | Chen et al. ..................... 385/88 |
| 6,773,167 | B2 | | 8/2004 | Scanzillo |
| 6,819,855 | B2 | | 11/2004 | Fujiwara et al. |
| 7,284,912 | B2 | * | 10/2007 | Suzuki et al. ................... 385/75 |
| 7,556,436 | B2 | | 7/2009 | Van Der Steen |
| 7,963,704 | B2 | * | 6/2011 | Andrei et al. ................... 385/69 |
| 8,218,335 | B2 | * | 7/2012 | Moore et al. .................. 361/801 |
| 8,915,652 | B2 | | 12/2014 | Katagiyama et al. |

(Continued)

FOREIGN PATENT DOCUMENTS

CN 102272646 A 7/2011

OTHER PUBLICATIONS

"ANSI/VITA 66.1—Optical Interconnect on VPX-MT Variant", American National Standards Institute, Inc., Dec. 2011.

*Primary Examiner* — Peter Radkowski
(74) *Attorney, Agent, or Firm* — Jeffrey K. Jacobs

(57) ABSTRACT

An optical fiber connector assembly for mounting on a substrate includes a housing and a receptacle opening in a direction generally perpendicular to the substrate. A multi-fiber ferrule receives optical fibers with one of the optical fibers defining an optical fiber axis. A ferrule carrier with the ferrule is positioned within the receptacle. A locking member locks the ferrule carrier within the receptacle. In one embodiment, the locking member move generally parallel to the optical fiber axis. In another embodiment, the locking member rotates relative to the optical fiber axis.

18 Claims, 19 Drawing Sheets

(56) References Cited

U.S. PATENT DOCUMENTS

2001/0041030 A1* 11/2001 Chen et al. .................... 385/88
2006/0098923 A1* 5/2006 Fujiwara et al. ............... 385/88
2006/0153504 A1* 7/2006 Suzuki et al. .................. 385/71
2006/0245694 A1* 11/2006 Chen et al. .................... 385/71
2006/0263011 A1* 11/2006 Chen et al. .................... 385/75
2009/0032291 A1* 2/2009 Moore et al. ................. 174/255
2009/0175580 A1* 7/2009 Chen et al. .................... 385/75
2009/0279832 A1* 11/2009 Andrei et al. .................. 385/69

* cited by examiner

OPTICAL FIBER CONNECTOR ASSEMBLY

REFERENCE TO RELATED APPLICATIONS

The Present Disclosure claims priority to prior-filed U.S. Provisional Patent Application No. 61/680,345, entitled "Optical Backplane," filed on 7 Aug. 2013 with the United States Patent And Trademark Office. The content of the aforementioned patent application is incorporated in its entirety herein.

BACKGROUND OF THE PRESENT DISCLOSURE

The Present Disclosure relates, generally, to optical fiber assemblies and, more particularly, to an optical fiber assembly having a ferrule carrier removable without the use of tools.

Systems for interconnecting optical fibers typically utilize mating optical fiber connector or interconnect assemblies to facilitate handling and accurate positioning of the optical fibers. The individual optical fibers may be secured within a ferrule of each connector assembly, and the mating ferrules align the axis of each mating pair of optical fibers.

The optical interfaces of the optical fibers sometimes become contaminated with dirt, dust and other debris such that the optical interfaces require cleaning. In some instances, it may be possible to clean the optical interfaces with the connectors in place. In other instances, it may be necessary to remove the optical fiber connectors from their operating environment to perform such a cleaning operation.

Optical fiber connectors may be mounted on a substrate or board such as a backplane or daughter card through the use of screws and other mounting hardware. In addition, other components may be mounted on the substrate in close proximity to the connector. When removing an optical fiber connector from a substrate, such other components may interfere with access to the mounting hardware of the optical fiber connector or interfere with the ability of an operator to position a tool in the desired position to easily remove the mounting hardware that secures the optical fiber connector to the substrate. Such interference may substantially increase the difficulty and thus the time required to remove and replace optical fiber connectors mounted on a substrate.

The foregoing background discussion is intended solely to aid the reader. It is not intended to limit the innovations described herein, nor to limit or expand the conventional state of the art, as discussed. Thus, the foregoing discussion should not be taken to indicate that any particular element of a conventional system is unsuitable for use with the innovations described herein, nor is it intended to indicate that any element is essential in implementing the innovations described herein. The implementations and application of the innovations described herein are defined by the appended Claims.

SUMMARY OF THE PRESENT DISCLOSURE

In one aspect, an optical fiber connector assembly for mounting on a substrate includes a housing having a substrate mounting face and ferrule carrier receptacle. The substrate mounting face defines a mounting plane and the ferrule carrier receptacle opens in a direction generally perpendicular to the mounting plane and defines a ferrule carrier insertion axis along which a ferrule carrier may be inserted. A multi-fiber ferrule has a plurality of bores with each bore being configured to receive an optical fiber therein. One of the plurality of bores defines an optical fiber axis. A ferrule carrier is positioned within the ferrule carrier receptacle and has a ferrule receiving receptacle with the ferrule therein. The optical fiber axis is parallel to the mounting plane.

In another aspect, an optical fiber connector assembly for mounting on a substrate includes a housing having a substrate mounting face and ferrule carrier receptacle. The substrate mounting face defines a mounting plane and the ferrule carrier receptacle opens in a direction generally perpendicular to the mounting plane and defines a ferrule carrier insertion axis along which a ferrule carrier may be inserted. A multi-fiber ferrule has a plurality of bores with each bore being configured to receive an optical fiber therein. One of the plurality of bores defines an optical fiber axis. A ferrule carrier is positioned within the ferrule carrier receptacle and has a ferrule receiving receptacle with the ferrule therein. The optical fiber axis is perpendicular to the mounting plane. A locking member for locking the ferrule carrier within the ferrule carrier receptacle is rotatable relative to the optical fiber axis.

In still another aspect, an optical fiber connector assembly for mounting on a substrate includes a metal housing having a substrate mounting face and ferrule carrier receptacle. The substrate mounting face defines a mounting plane and the ferrule carrier receptacle opens in a direction generally perpendicular to the mounting plane and defines a ferrule carrier insertion axis along which a ferrule carrier may be inserted. A pair of multi-fiber ferrules have a plurality of bores with each bore being configured to receive an optical fiber therein. One of the plurality of optical fibers defines an optical fiber axis. A metal ferrule carrier is positioned within the ferrule carrier receptacle and has a pair of spaced apart ferrule receiving receptacles with one of the ferrules being within each receptacle. A locking member is provided for locking the ferrule carrier within the ferrule carrier receptacle.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
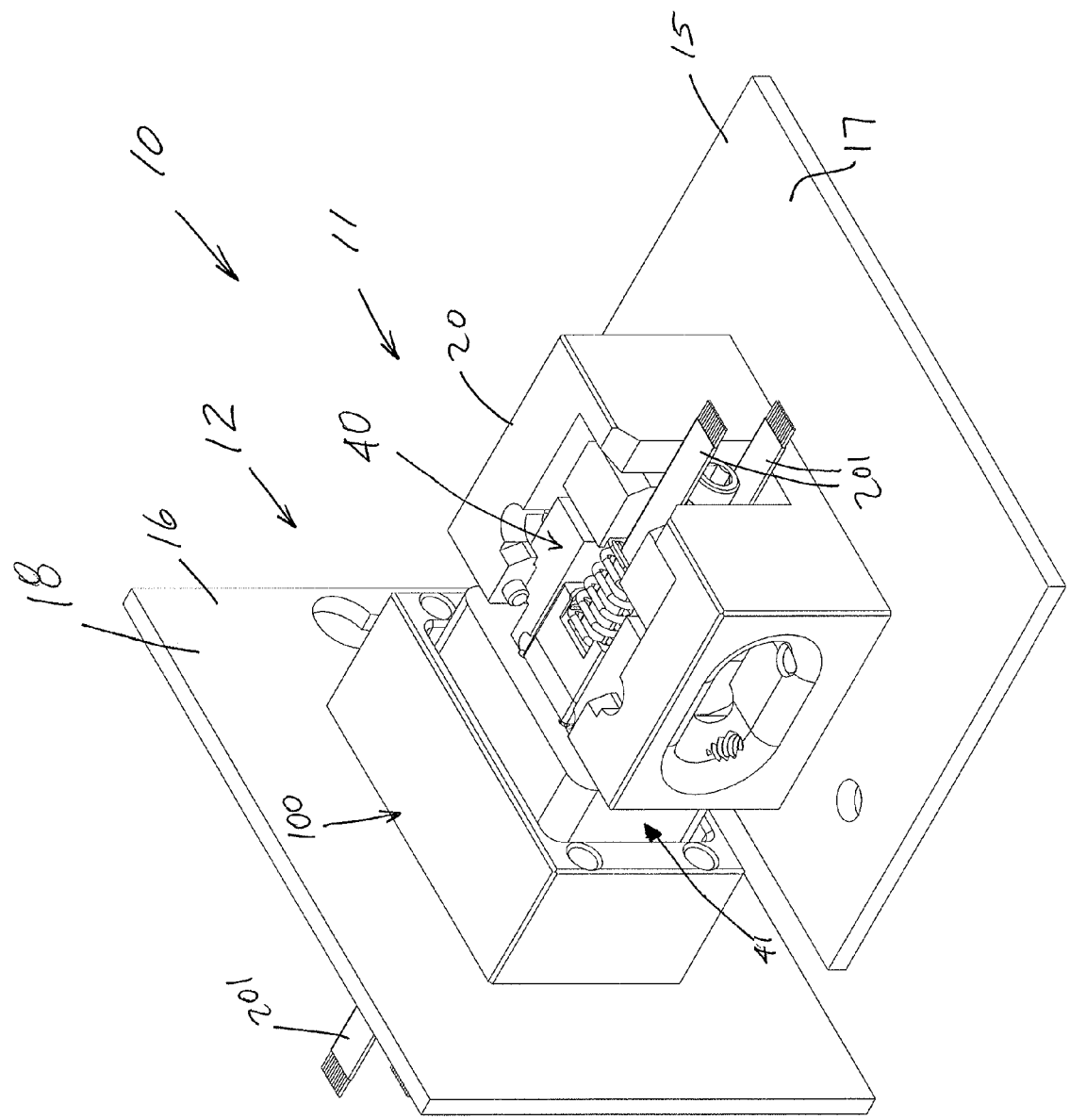
FIG. 1 is a perspective view of a mating optical fiber connector pair.
Figure 2:
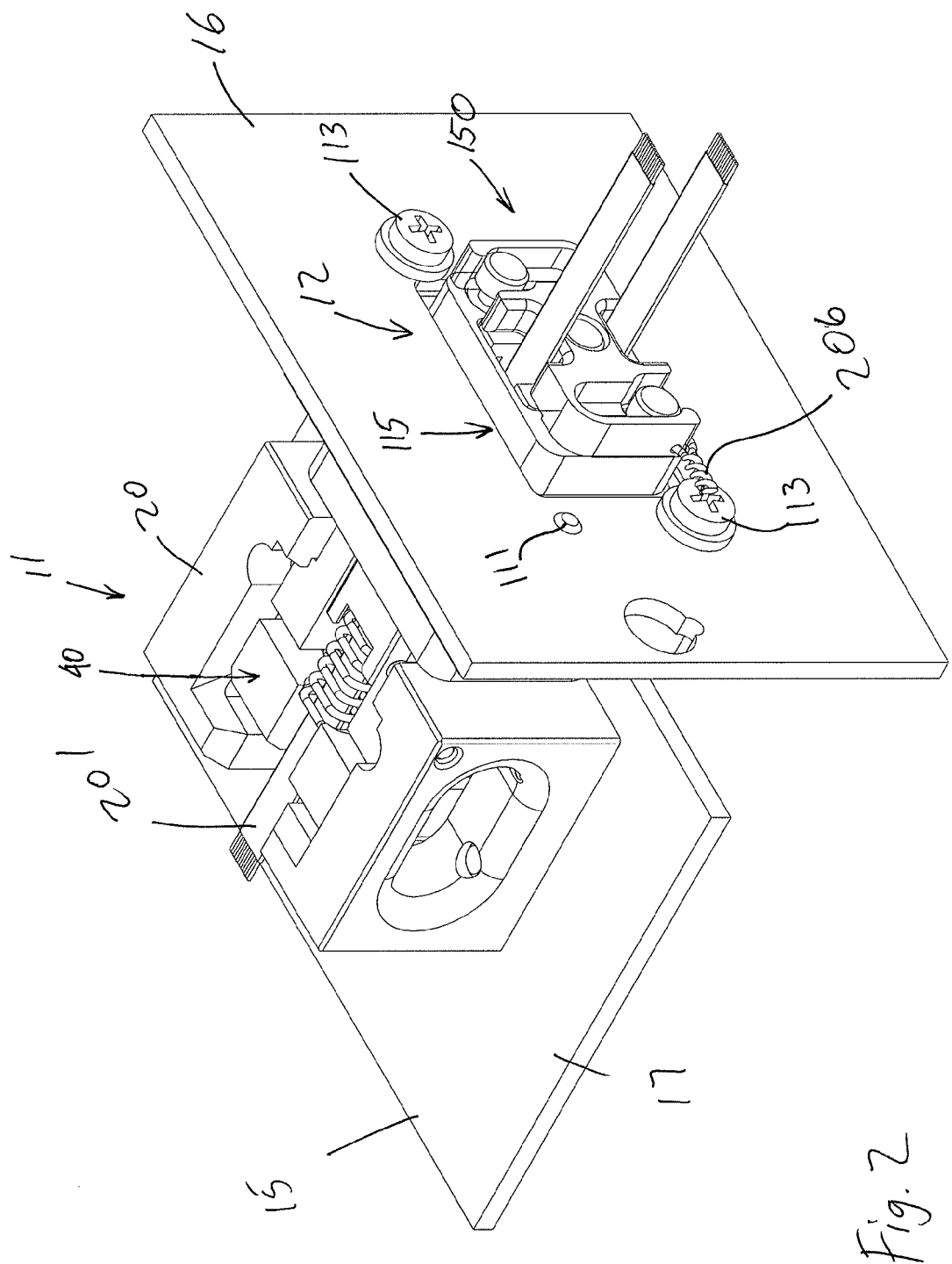
FIG. 2 is a perspective view of the mating optical fiber connector pair of FIG. 1 but with the optical fiber connectors reversed.
Figure 3:
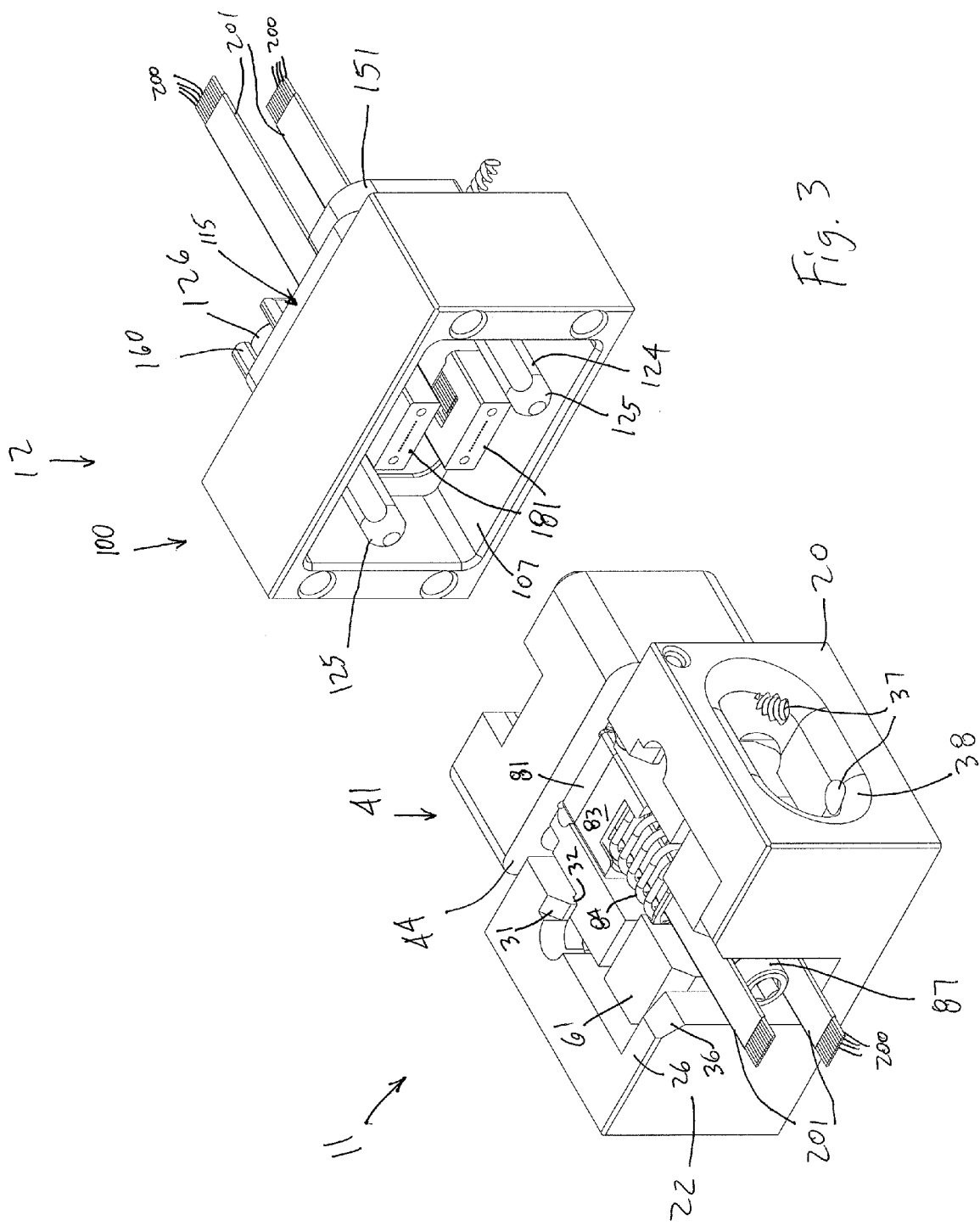
FIG. 3 is a perspective view similar to that of FIG. 2 but from a different perspective and with the backplane and daughter card removed.

FIGS. 1-3 depict a mating optical fiber connector pair generally designated 10. More specifically, the connector pair 10 includes a first optical fiber assembly configured as a plug interconnect assembly 11 and a second optical fiber assembly configured as a receptacle interconnect assembly 12. In FIGS. 1-2, each of the plug interconnect assembly 11 and the receptacle interconnect assembly 12 are depicted as being mounted on a circuit board or substrate with the plug interconnect assembly 11 mounted on a daughter card 15 and the receptacle interconnect assembly 12 mounted on a backplane 16. As depicted, the plug interconnect assembly 11 and the receptacle interconnect assembly 12 comply with the ANSI VITA 70.1 Standard. However, the principles and concepts disclosed herein are equally applicable to a wide variety of components and assemblies without regard to any standard or application.

Figure 4:
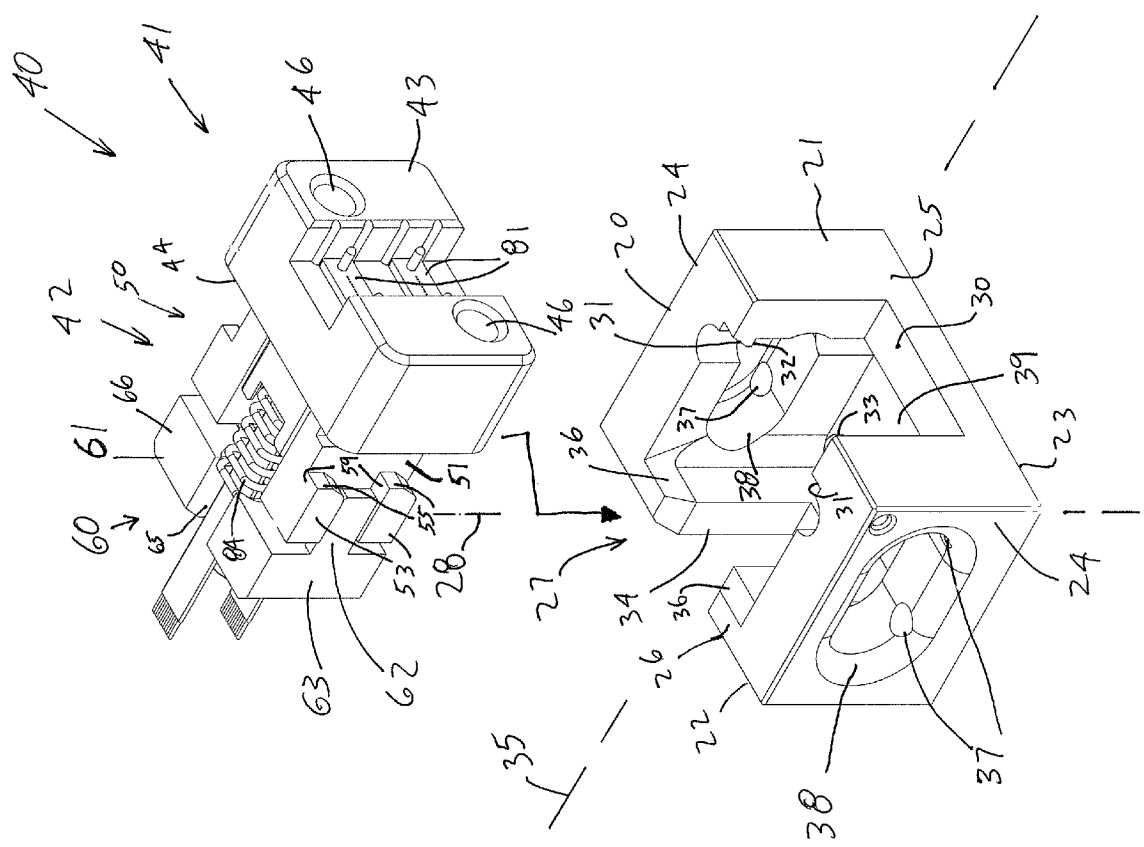
FIG. 4 is a perspective view of the plug housing and the plug ferrule carrier prior to insertion of the ferrule carrier into the housing.
Figure 5:
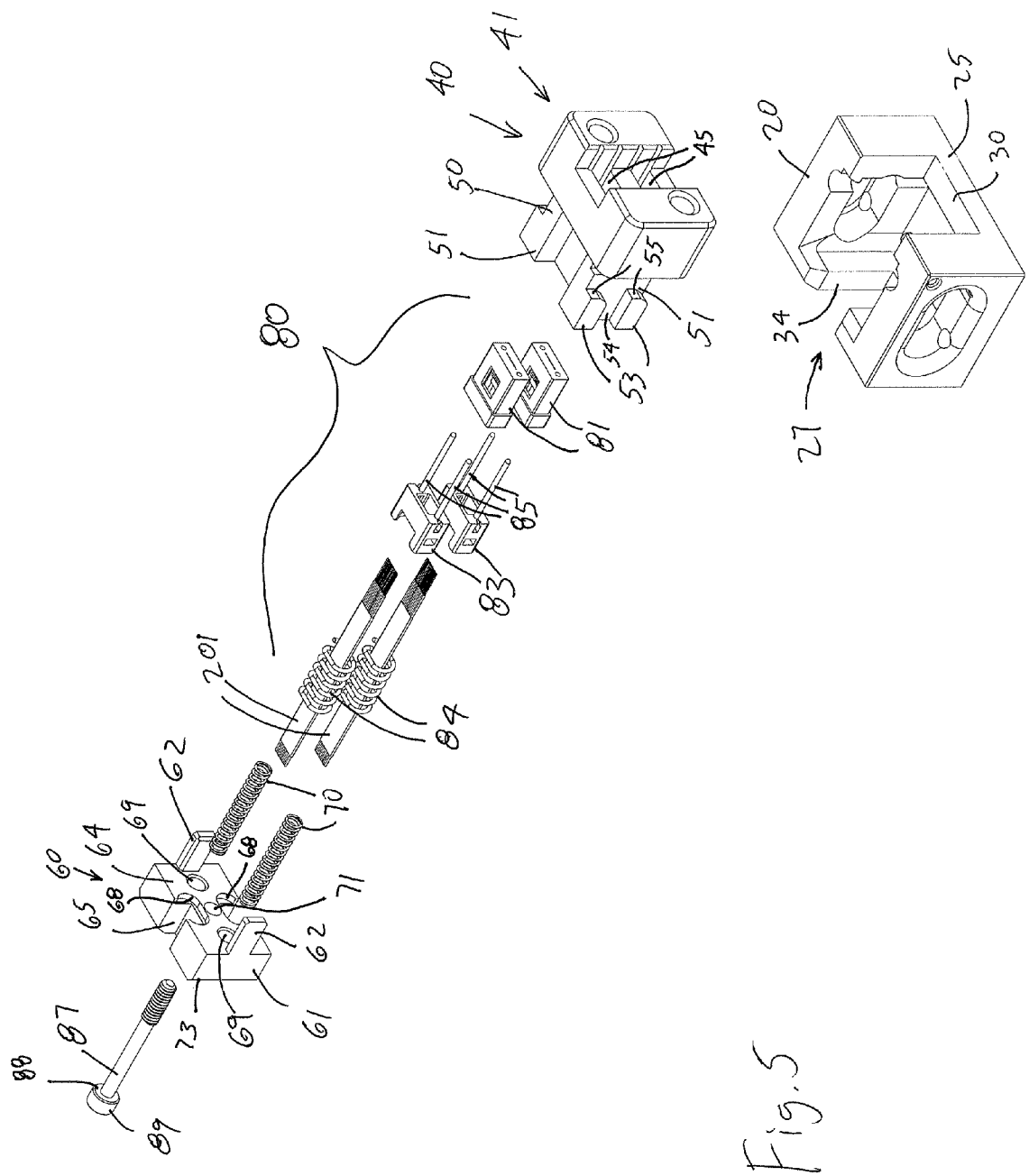
FIG. 5 is an exploded perspective view of the plug connector assembly of FIG. 4.
Figure 6:
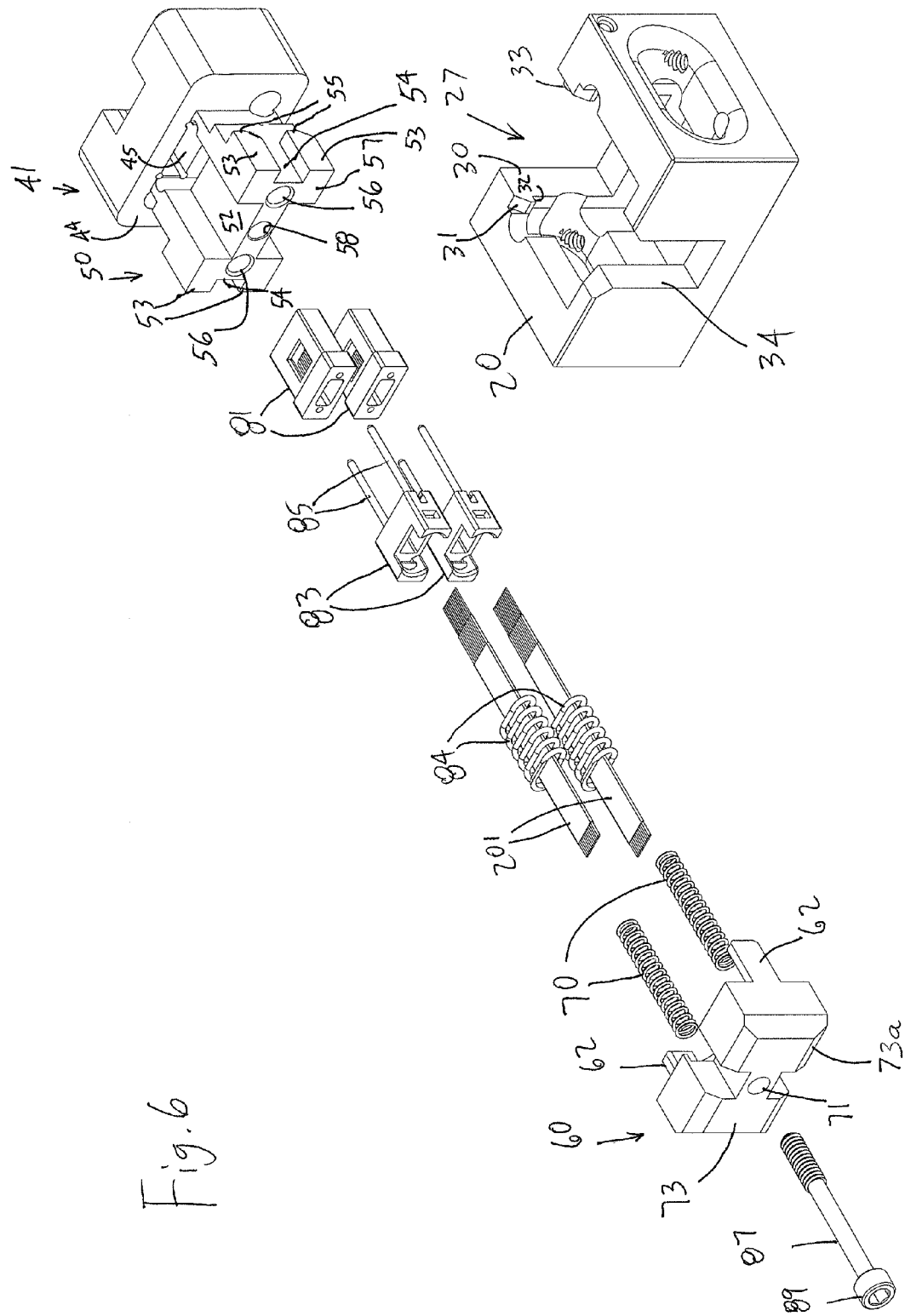
FIG. 6 is an exploded perspective view similar to that of FIG. 5 but from a different perspective.
Figure 8:
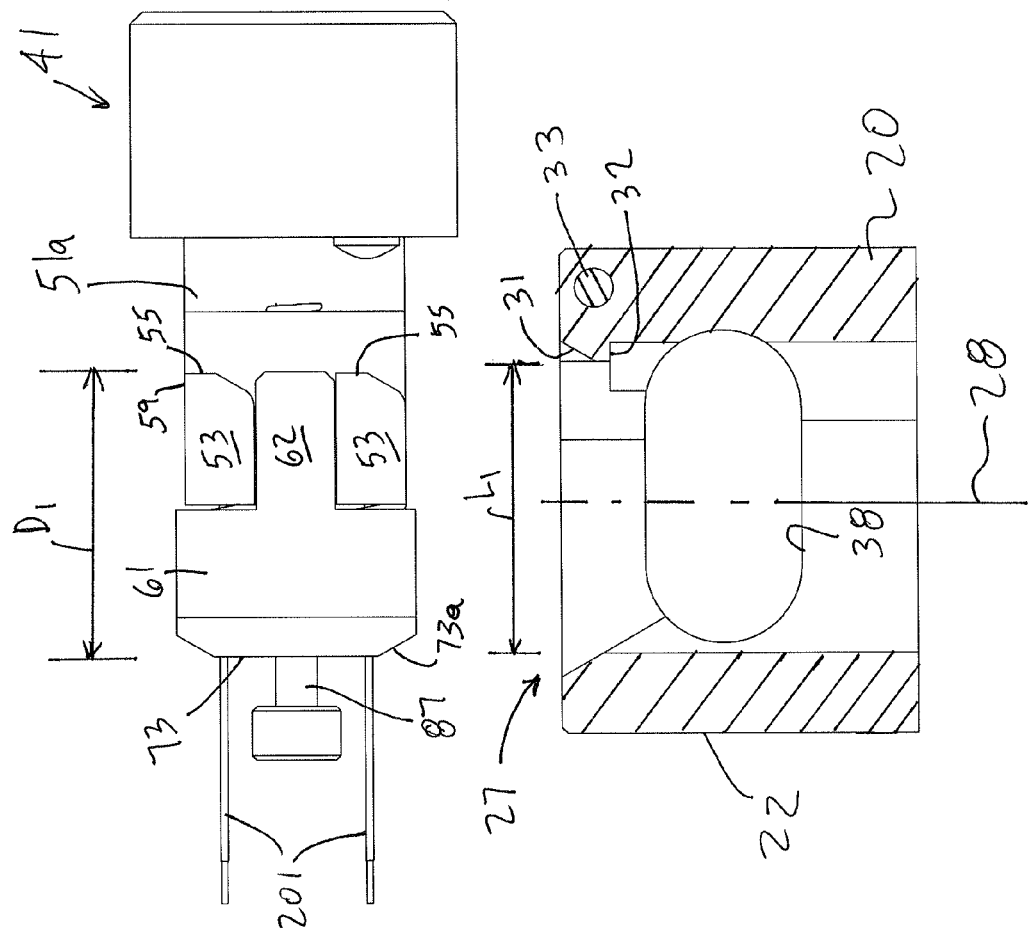
FIG. 8 is a side view of the plug housing and the plug ferrule carrier of FIG. 7 prior to inserting the ferrule carrier into the housing and with the plug housing in section.

Referring to FIGS. 4-6, plug interconnect assembly 11 includes a mounting member or plug housing 20 for securing the plug interconnect assembly to a substrate such as daughter card 15. A plug ferrule carrier or sub-assembly 40 is removably mounted within plug housing 20 and has a plurality of ferrules 81 with a plurality of optical fibers 200 mounted therein. The plug housing 20 is generally rectangular with a front or mating face 21, an oppositely facing rear face 22 and a substrate mounting face or board mounting surface 23 for positioning adjacent a surface 17 of daughter card 15. Plug housing 20 includes a pair of spaced apart sidewalls 24 that extend upward or away from mounting surface 23, a front wall 25 that extends between the sidewalls 24 along the mating face 21, and a rear wall 26 extends between the sidewalls 24 along the rear face 22. The sidewalls 24, front wall 25 and rear wall 26 generally define a ferrule carrier receiving receptacle 27. The substrate mounting face 23 defines a mounting plane that is co-planar with daughter card 15. The ferrule carrier receptacle 27 opens in a direction generally perpendicular to the mounting plane and defines a ferrule carrier insertion axis 28 (FIG. 8) along which a ferrule carrier 40 may be inserted into the receptacle.

Front wall 25 has an opening 30 therein past which a forward or plug portion 41 of ferrule carrier 40 may extend. The front wall 25 may include a tapered or lead-in surface 31 to assist in guiding the ferrule carrier 40 into the receptacle 27. A locking surface 32 may extend below the lead-in surface 31 to assist in retaining the ferrule carrier 40 within the receptacle 27. If desired, a polarization post or projection 33 may extend into opening 30 and acts to ensure that ferrule carrier 40 is properly oriented when being inserted into receptacle 27. As described in further detail below, if ferrule carrier 40 is improperly oriented, the ferrule carrier will engage the polarization projection 33 and prevent the insertion of the ferrule carrier into the receptacle 27.

Rear wall 26 has an opening 34 therein generally centered along the mating axis 35 of the plug housing 20 and configured to receive the optical fiber cables 201 therethrough. The rear wall 26 may also include tapered surfaces 36 generally adjacent the opening 34 to assist in guiding the ferrule carrier 40 into the receptacle 27 and the optical fiber cables 201 into the opening 34.

Bores 37 may extend upward from board mounting surface 23 into plug housing 20 such as at sidewalls 24. Some or all of the bores 37 may be threaded to receive threaded fasteners (not shown) to facilitate securing the housing 20 to the daughter card 15. In the depicted embodiment, some of the bores 37 are configured to receive dowel pins (not shown) therein to facilitate placement of plug housing 20 on daughter card 15 prior to fastening the housing on the daughter card. If desired, openings 38 may extend through sidewalls 24 to receptacle 27 to reduce the weight of the plug interconnect assembly 11. Still further, a lower opening 39 may extend from the board mounting surface 23 to the receptacle 27 (i.e., the bottom of receptacle 27 may be open) to further reduce weight.

Plug ferrule carrier 40 includes a ferrule retaining plug portion 41 and a locking portion 42 for retaining the carrier within the housing 20. Plug portion 41 is generally rectangular and includes a front mating face 43 and an oppositely facing rear face 44. A pair of pair of spaced apart rectangular openings 45 extend between the mating face 43 and the rear face 44 and are configured to slidably receive ferrules 81 therein. A pair of guide holes 46 may extend into the mating face 43.

Figure 7:
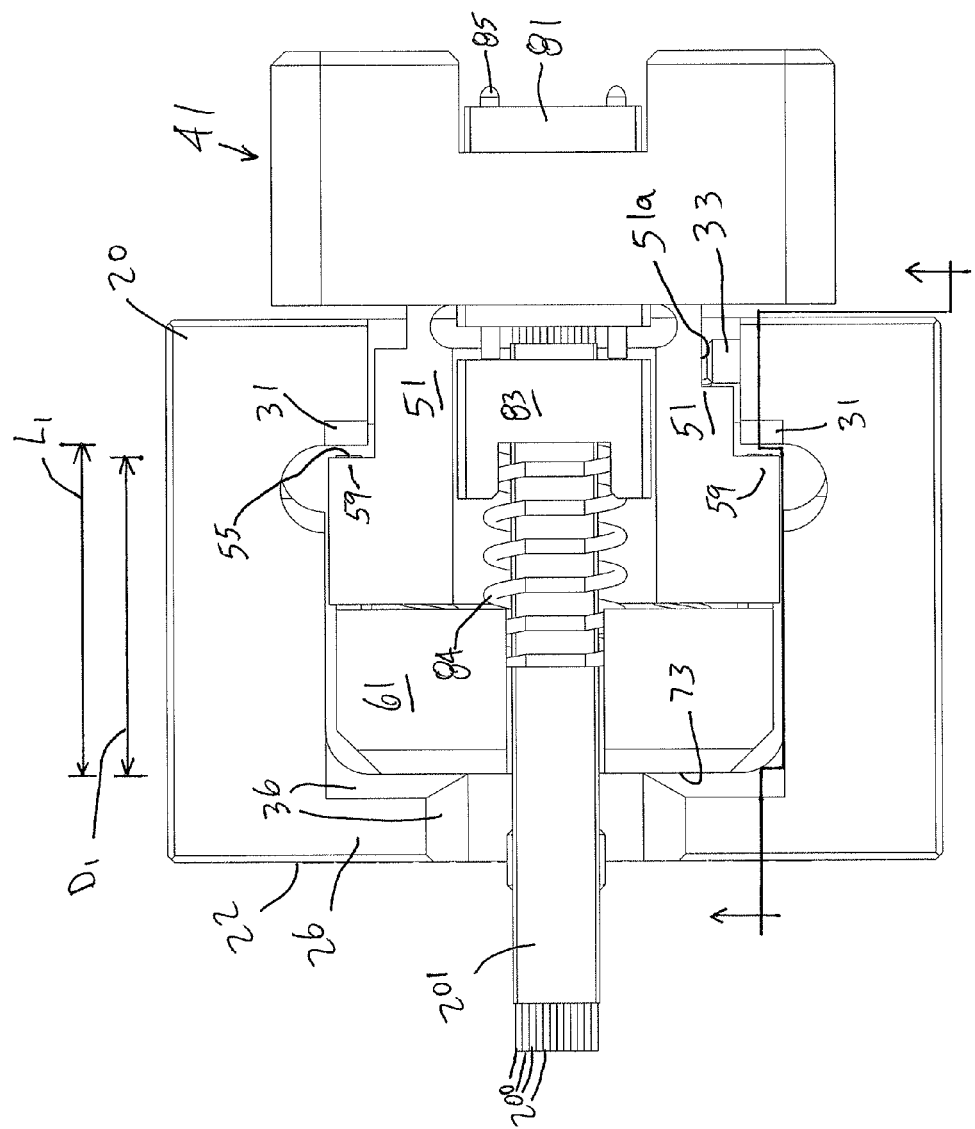
FIG. 7 is a top plan view of the plug housing and the plug ferrule carrier with the ferrule carrier in a compressed state to permit insertion into the housing.

Locking portion 42 includes a body portion such as rearwardly extending pedestal 50 integrally formed with plug portion 41 and a locking member such as plunger 60 movably mounted on the pedestal. The pedestal 50 has a pair of spaced apart legs 51 that may be connected by a web 52 to increase the rigidity and strength of the pedestal and to provide support to ferrules 81. One of the legs 51 may have an enlarged recess or opening 51a (FIG. 7) through which polarization projection 33 may pass when plug ferrule carrier 40 is inserted into receptacle 27. The interaction of the polarization projection 33 and the opening 51a ensure that the plug ferrule carrier 40 may only be inserted into receptacle 27 in one orientation.

A pair of spaced apart projections 53 extend forwardly from the rear edge of pedestal 50 towards plug portion 41 along the outer surface of each leg 51. The space between the projections 53 define a guide opening or slot 54 as described further below. A lower edge of the projections adjacent the front or leading edge 55 (i.e., towards the rear face 44 of plug portion 41) may be sloped or tapered to assist in guiding the ferrule carrier 40 into receptacle 27. A pair of spring recesses or bores 56 may be provided in a rear surface 57 of the pedestal 50 and be dimensioned to receive a portion of locking springs 70 therein. A threaded stop bore 58 may be provided in the rear surface 57 of the pedestal 50 and receive an end of a stop bolt 87 therein.

The movable plunger 60 includes a generally rectangular plate 61 with a forwardly projecting guide arm 62 extending from of the opposite edges or sides 63 of the plate. The guide arms 62 are dimensioned to be slidably received within the guide slot 54 between the projections 53. A lower edge 64 adjacent the rear surface 73 of plate 61 may be tapered to assist in inserting plunger 60 into receptacle 27. The plate 61 may include a pair of openings 65 with one extending from each of the upper surface 66 and the lower surface 67 of the plate 61. The openings 65 may be generally aligned with the rectangular openings 45 and be configured to receive the optical fiber cables 201 therethrough. First spring receiving recesses 68 may extend rearwardly into the forward face 64 of plate 61 and be aligned with a portion of the openings 65. The first spring receiving recesses 68 may be dimensioned to receive an end of the ferrule assembly springs 84 therein.

Second spring receiving recesses 69 may extend rearwardly into the forward face 64 of plate 61 generally adjacent guide arms 62. The second spring receiving recesses 69 may be dimensioned to receive an end of the locking springs 70 therein. A biasing member such as locking springs 70 extends between the forward face 64 of plate 61 and the spring bores 56 within the pedestal 50. Locking springs 70 bias the plunger 60 away from the pedestal 50.

A stop passage 71 may extend through the plate 61. Stop bolt 87 extends through the stop passage 71 in plate 61 and is threaded into or otherwise secured within stop bore 58 in the rear surface 57 of pedestal 50 to retain the plunger 60 to pedestal 50. The forward or stop surface 88 of the head 89 of stop bolt 87 engages the rear surface 73 of plate 61 to define the distance that plunger 60 may move away from the rear surface 57 of pedestal 50.

A pair of ferrule assemblies 80 may be mounted on ferrule carrier 40 and extend between the front mating face 43 of plug portion 41 and plate 61. Each ferrule assembly 80 may include a multi-fiber ferrule 81 having a plurality of bores 82 with an optical fiber 200 positioned in each bore, a ferrule guide 83 and a ferrule assembly spring 84. Each optical fiber 200 may define an optical fiber axis along which light may pass to a mating optical fiber. As depicted in FIGS. 1-2, the optical fiber axes are parallel to the daughter card 15 and thus the mounting plane defined by the substrate mounting face 23. The ferrule guides 83 may include a pair of guide posts 85 to assist in aligning the ferrules 81 with mating ferrules 181. While ferrules 81 and ferrule guides 83 are depicted with an MT type interface, other configurations are contemplated. One end of ferrule assembly spring 84 may engage a first spring receiving recess 68 of plate 61 and the other the ferrule guide 83 to bias the ferrule 81 away from plate 61.

Referring to FIGS. 7-11, the process for inserting and locking the ferrule carrier 40 within plug housing 20 is depicted. Ferrule carrier 40 may be inserted into plug housing 20 by moving the plunger 60 towards the rear surface 57 of pedestal 50. In doing so, the guide arms 62 slide within the guide slots 54 and the locking springs 70 and the ferrule assembly springs 84 are compressed. In addition, the rear surface 73 of the plate 61 moves away from the stop surface 88 of the head 89 of stop bolt 87. The plunger 60 may be moved towards rear surface 57 of pedestal 50 a sufficient distance so that the distance "D1" (FIGS. 7-9) between the rear surface 73 of plate 61 and the leading edge 55 of projections 53 on pedestal 50 is approximately equal to or less than the front-to-rear dimension "L1" of the opening of receptacle 27 of housing 20. In such a configuration, the plunger 60 is positioned at an insertion position and the locking portion 42 has compressed length D1.

The distance D1 may be approximately equal to the distance L1 due to the tapered surfaces at the front wall 25 and the rear wall 26 of housing 20 and the leading edge 55 of projections 53 on pedestal 50 and the lower edge 73a of the plunger 60. The plurality of tapered surfaces may interact to move the plunger 60 closer to the plug portion 41 during insertion and permit the ferrule carrier 40 to enter receptacle 27.

Once the ferrule carrier 40 is inserted into receptacle 27, the upper surface 59 of the upper projection 53 is positioned below the locking surface 32 of the front wall 25. The force applied to compress the locking springs 70 and the ferrule assembly springs 84 may then be removed so that the biasing force from the locking springs 70 and the ferrule assembly springs 84 forces the plunger 60 away from the rear face 44 of pedestal 50. This moves the pedestal 50 so that the distance "D2" (FIGS. 10-11) between the rear surface 73 of plate 61 and the leading edge 55 of projections 53 on pedestal 50 is greater than the front-to-rear dimension "L1" of the opening of receptacle 27 of housing 20. The upper surfaces 59 of the upper projections 53 of pedestal 50 extend under the locking surface 32 of the front wall 25 to lock and retain the ferrule carrier 40 within the receptacle 27 of housing 20. In such a configuration, the plunger 60 is positioned at a locked position and the locking portion 42 has a locked length D2. As depicted, the locking springs 70 and the ferrule assembly springs 84 may be compressed to some extent while ferrule carrier 40 is locked within the receptacle 27 and the locking portion 42 is at its locked length D2.

Through such a configuration, the ferrule carrier 40 may be manually inserted into and locked within the receptacle 27 without the use of tools. The receptacle 27 opens upward and away from the daughter card 15 so that it is unlikely that the position of other components on the daughter card will affect the ability of an operator to insert the ferrule carrier 40 into the housing 20. After the plug interconnect assembly 11 is mounted on daughter card 15, the ferrule carrier 40 may be easily removed without removing the housing 20 from the daughter card 15. This may be desirable so that the ends of the optical fibers 200 may be cleaned or the entire ferrule assembly 80 replaced.

Figure 12:
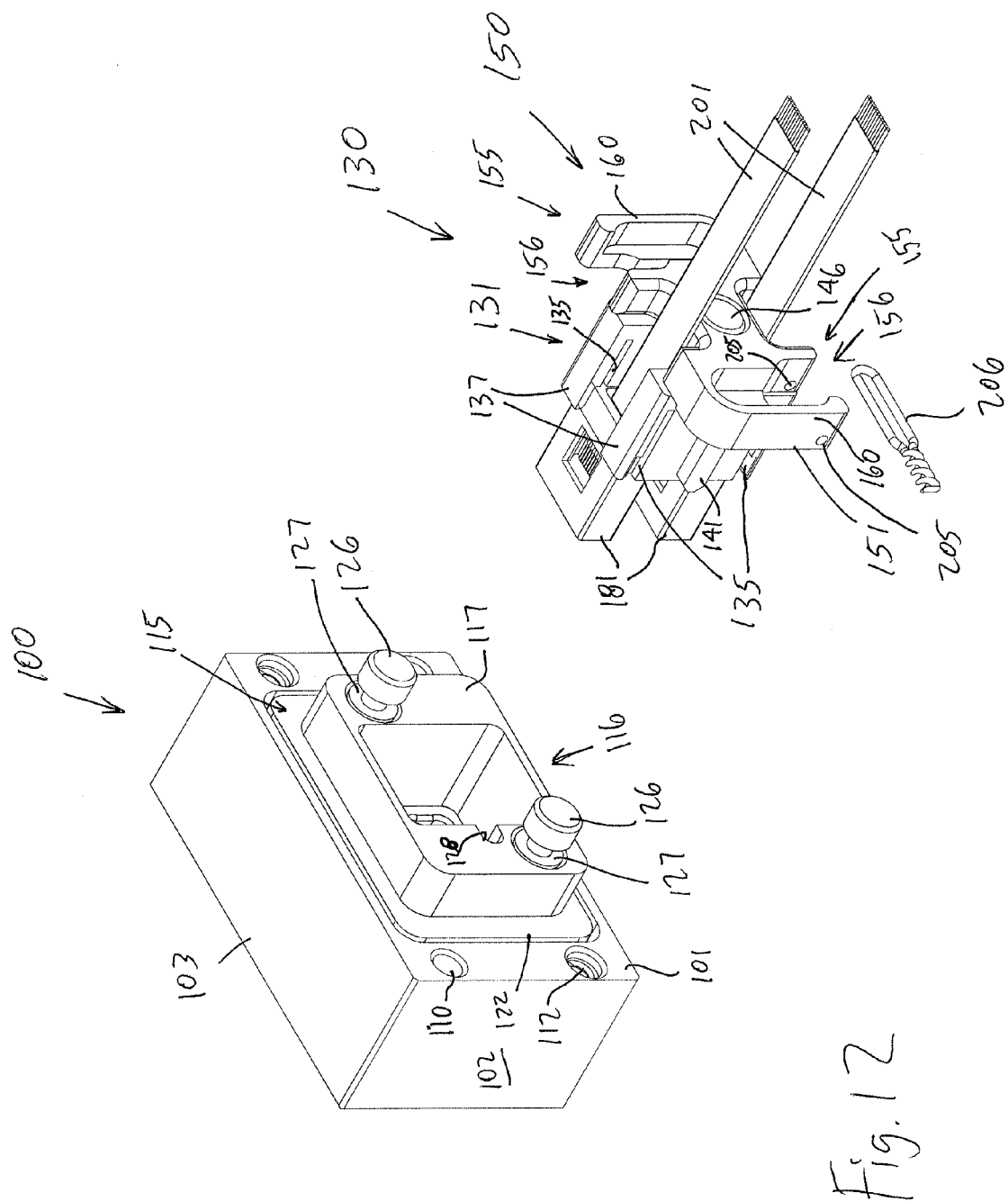
FIG. 12 is a perspective view of the receptacle housing and the receptacle ferrule carrier prior to insertion of the ferrule carrier into the housing.
Figure 13:
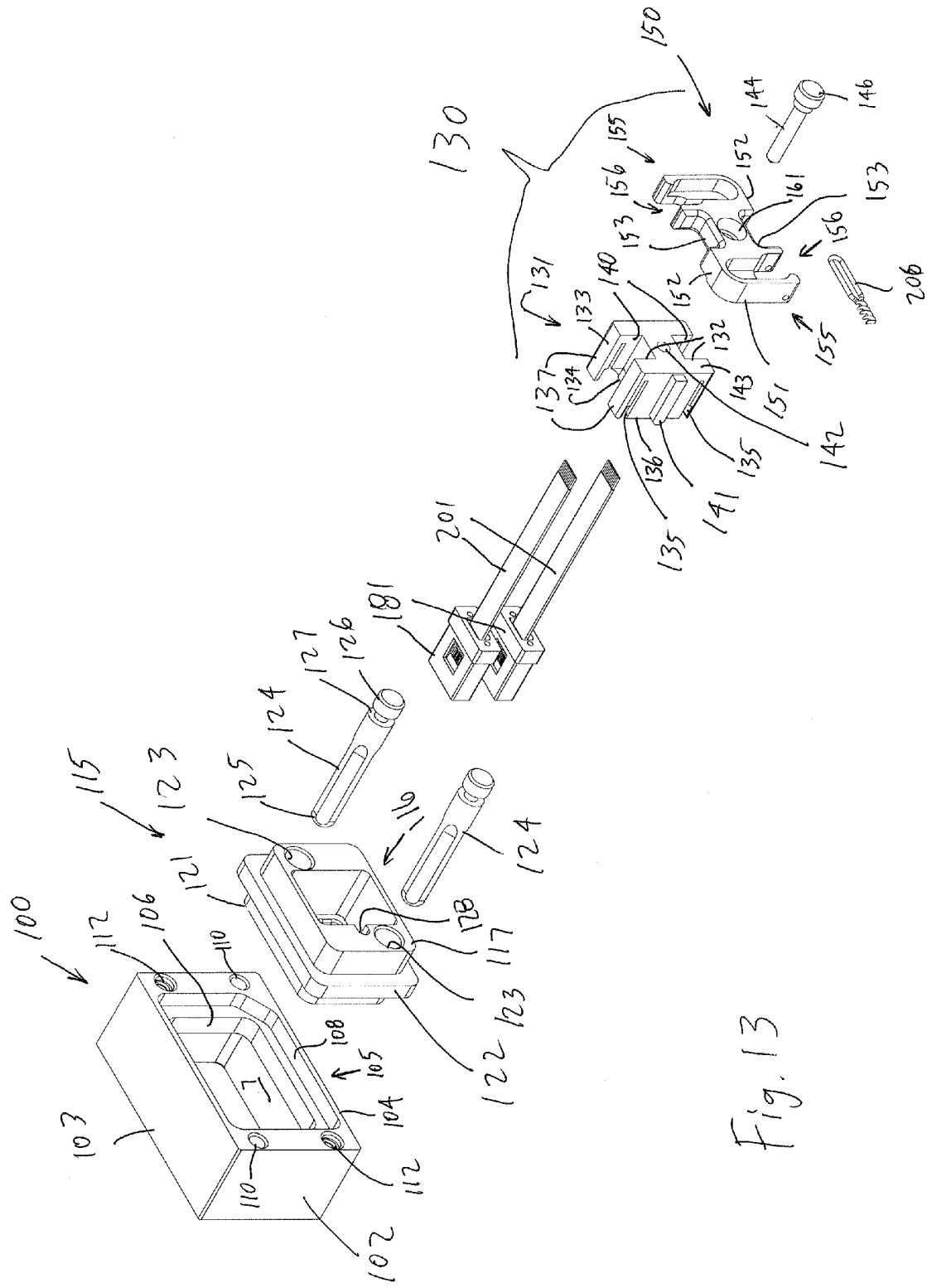
FIG. 13 is an exploded perspective view of the receptacle connector assembly of FIG. 12.
Figure 14:
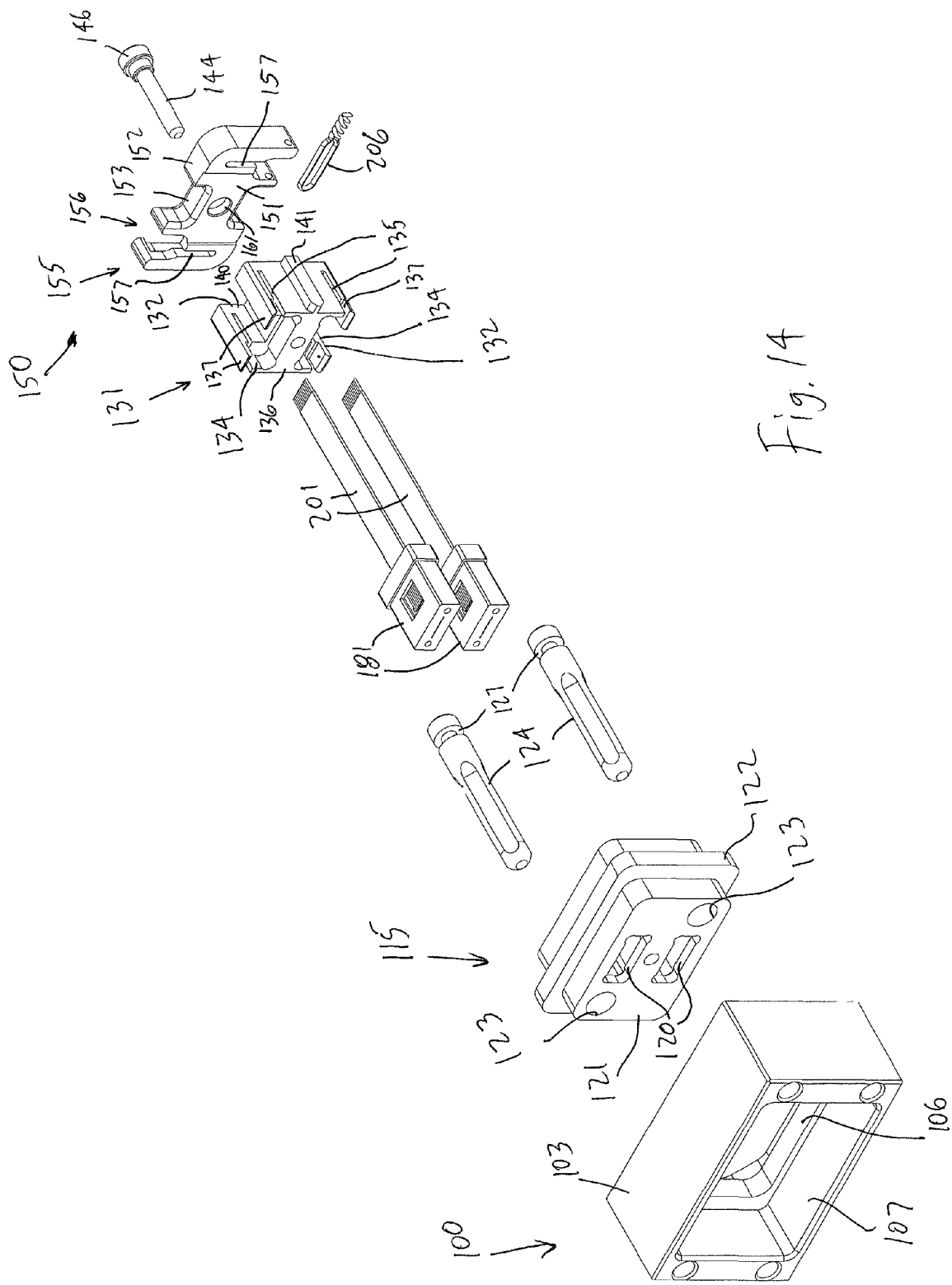
FIG. 14 is an exploded perspective view similar to that of FIG. 13 but from a different perspective.

Referring to FIGS. 12-4, receptacle interconnect assembly 12 includes a mounting member or receptacle housing 100 for securing the receptacle interconnect assembly to a substrate such as the backplane 16. A receptacle ferrule carrier or sub-assembly 130 is removably mounted within receptacle housing 100 and has a plurality of ferrules 181 with a plurality of optical fibers 200 mounted therein. The receptacle housing 100 is generally rectangular with a rear or substrate mounting face 101 for positioning adjacent a surface 18 of backplane 16. Receptacle housing 100 includes a pair of spaced apart sidewalls 102 that extend away from board mounting face 101, a top wall 103 that extends between the sidewalls 102 along one edge of the sidewalls and a bottom wall 104 that extends between the sidewalls 102 along another edge of the sidewalls. The sidewalls 102, top wall 103, and rear wall 104 generally define a generally rectangular insert receiving receptacle 105. Insert receiving receptacle 105 may include an area 106 of reduced cross-section which thus defines a first or forward portion 107 of receptacle 105 spaced from the board mounting face 101 and a second or rear portion 108 of the receptacle generally adjacent board mounting face 101.

Board mounting face 101 may include alignment bores 110 at opposite corners of the board mounting face for receiving alignment dowels 111 that may be positioned therein and function to align the receptacle housing 100 on backplane 16. Threaded bores 112 may be positioned at opposite corners of the board mounting face 101 opposite the alignment bores 110 and receive fasteners such as screws 113 to secure the receptacle housing 100 to the backplane 16.

Housing insert 115 is generally rectangular and includes a generally rectangular ferrule carrier receiving receptacle 116 extending forwardly from rear face 117. The substrate mounting face 101 defines a mounting plane that is co-planar with backplane 16. The ferrule carrier receiving receptacle 116 opens in a direction generally perpendicular to the mounting plane and defines a ferrule carrier insertion axis 118 (FIG. 15) along which a ferrule carrier 40 may be inserted into the receptacle. A pair of apertures 120 extend from the ferrule carrier receptacle 116 through the front face 121 of the housing insert 115. The apertures 120 may be generally rectangular and configured so that ferrules 181 may pass therethrough. A flange 122 extends around the periphery of the housing insert 115.

The housing insert 115 is dimensioned to be floatingly received within insert receiving receptacle 105 of the receptacle housing 100 and captured between the housing and the backplane 16. More specifically, the outside of the housing insert 115 and the flange 122 are dimensioned so as to float within the area 106 of reduced cross-section and the rear portion 108 of the insert receiving receptacle 105, respectively, to permit the housing insert to float within the insert receiving receptacle 105.

A pair of pin-receiving bores 123 may extend through the housing insert 115 between the rear face 117 and the front face 121 of the insert. Alignment and locking pins 124 may be fixed therein. A forward portion 125 of the pins 124 may be tapered to assist in aligning the receptacle interconnect assembly 12 with the plug interconnect assembly 11 during mating of the two assemblies. A rear portion 126 may include an annular shaped recess 127 for locking the receptacle ferrule carrier 130 to the housing insert 115. As such, the pins 124 are multi-functional and include the forward portion 125 to assist in aligning the mating interconnect assemblies and further include the rear portion 126 to lock the receptacle ferrule carrier 130 to the housing insert 115.

If desired, the ferrule carrier receptacle 116 may include a longitudinally extending polarization slot 128 that extends forwardly from the rear face 117 of the housing insert 115. Although the slot 128 is depicted as extending along one of the sides of the receptacle 116, the slot may be positioned at other locations about the receptacle.

Receptacle ferrule carrier 130 includes a ferrule retaining portion 131 and a locking portion 150 for retaining the carrier within the housing insert 115. Ferrule retaining portion 131 is generally rectangular with generally rectangular openings 132 along oppositely facing upper and lower surfaces 133 so that the ferrule retaining portion may be characterized as being somewhat H-shaped. The openings 132 include a first or forward section 134 dimensioned to receive a portion of ferrules 181 therein. A slot 135 may extend rearwardly from a front surface 136 of the ferrule carrier 130 to create resilient arms 137 adjacent the surfaces 133. Upon inserting a ferrule 181 into the forward section 134, the arms 137 will deflect to retain the ferrule within the forward section. A second or rear section 140 of the openings 132 of ferrule retaining portion 131 may be dimensioned to receive an optical fiber cable 201 therethrough.

A longitudinally extending polarization rib 141 extends along a side of the ferrule carrier 130 and is configured to slide within the polarization slot 128 of the ferrule carrier receptacle 116. The interaction of the polarization slot 128 and the polarization rib 141 ensure that the ferrule carrier 130 may only be inserted into receptacle 116 in one orientation.

Receptacle locking portion 150 operates to lock the receptacle ferrule carrier 130 to the housing insert 115. Locking portion 150 includes receptacle locking member 151 and associated components. The locking member 151 is generally S-shaped and has upper and lower oppositely facing surfaces 152 with a recess or channel 153 through which optical fiber cables 201 may pass. The channels 153 may be wider than the optical fiber cable 201 (and the rear section 140 of openings 132 of ferrule retaining portion 131) to permit the locking member 151 to pivot or rotate without deflecting the optical fiber cable.

Locking member 151 further includes locking sections 155 at opposite sides thereof. The locking sections 155 each include an inlet 156 for receiving the rear portion 126 of pin 124. A slot 157 extends from the inlet 156 to create a deflectable locking arm or beam 160. The slot 157 and the deflectable beam 160 are configured and dimensioned to receive the annular recess 127 of the rear portion 126 of pin 124 in a locking manner upon positioning the annular recess within the inlet 156 and rotating the locking member 151 relative to the alignment pins.

Locking member 151 includes a bore 161 therethrough. Ferrule retaining portion 131 includes a threaded bore 142 that extends forwardly from the rear surface 143 of the ferrule retaining portion and is generally centrally located thereon. A bolt or screw 144 extends through the bore 161 in locking member 151 and is secured within the bore 142. A space or gap (not shown) is located between the head 146 of the bolt 144 and the ferrule retaining portion 131 to permit the locking member 151 to pivot therein.

A pair of multi-fiber ferrules 181 may be mounted on receptacle ferrule carrier 130 with a portion of each ferrule positioned in the forward section 134 of opening 132. Each multi-fiber ferrule 181 may have a plurality of bores with an optical fiber 200 in each bore. An optical fiber cable 201 may extend rearwardly through rear section 140 of the opening 132 of ferrule retaining portion 131 and channel 153 of locking member 151. The ferrules 181 may be generally identical to the ferrules 81 described above but include guide holes 182 for receiving guide posts 85 therein when mating the ferrules. Ferrules 181 are depicted with an MT type interface but other configurations are contemplated.

Figure 9:
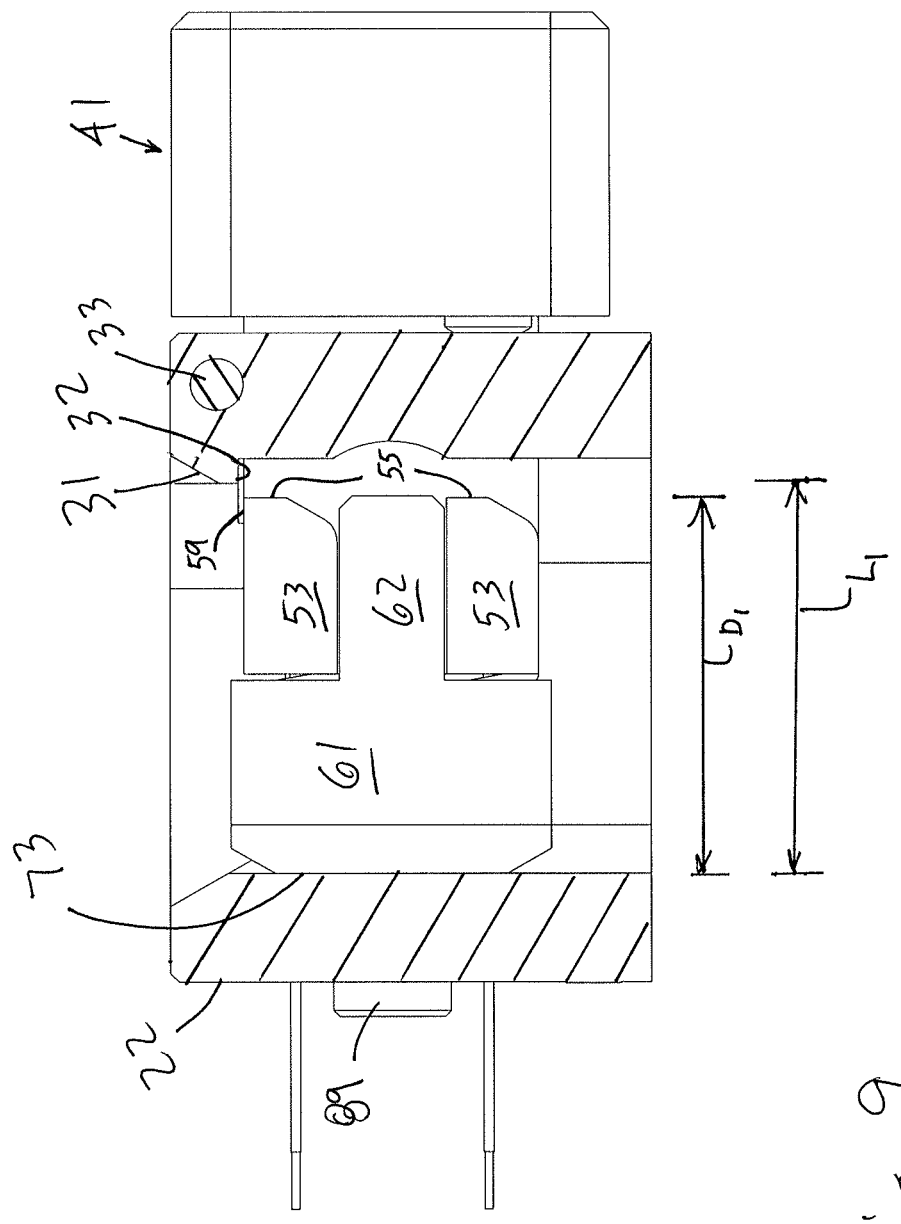
FIG. 9 is a side view similar to that of FIG. 8 but with the plug ferrule carrier inserted into the plug housing.
Figure 10:
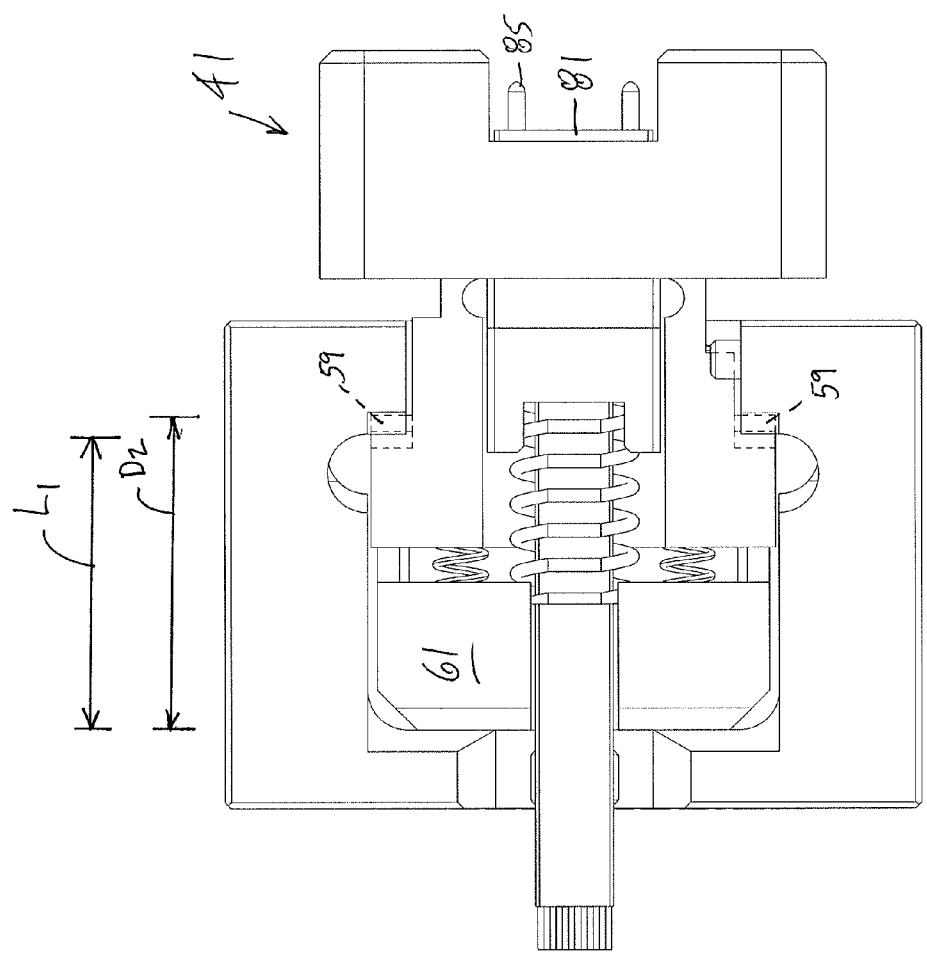
FIG. 10 is a top plan view similar to that of FIG. 7 but with the plug ferrule carrier in an uncompressed state and locked within the plug housing.
Figure 11:
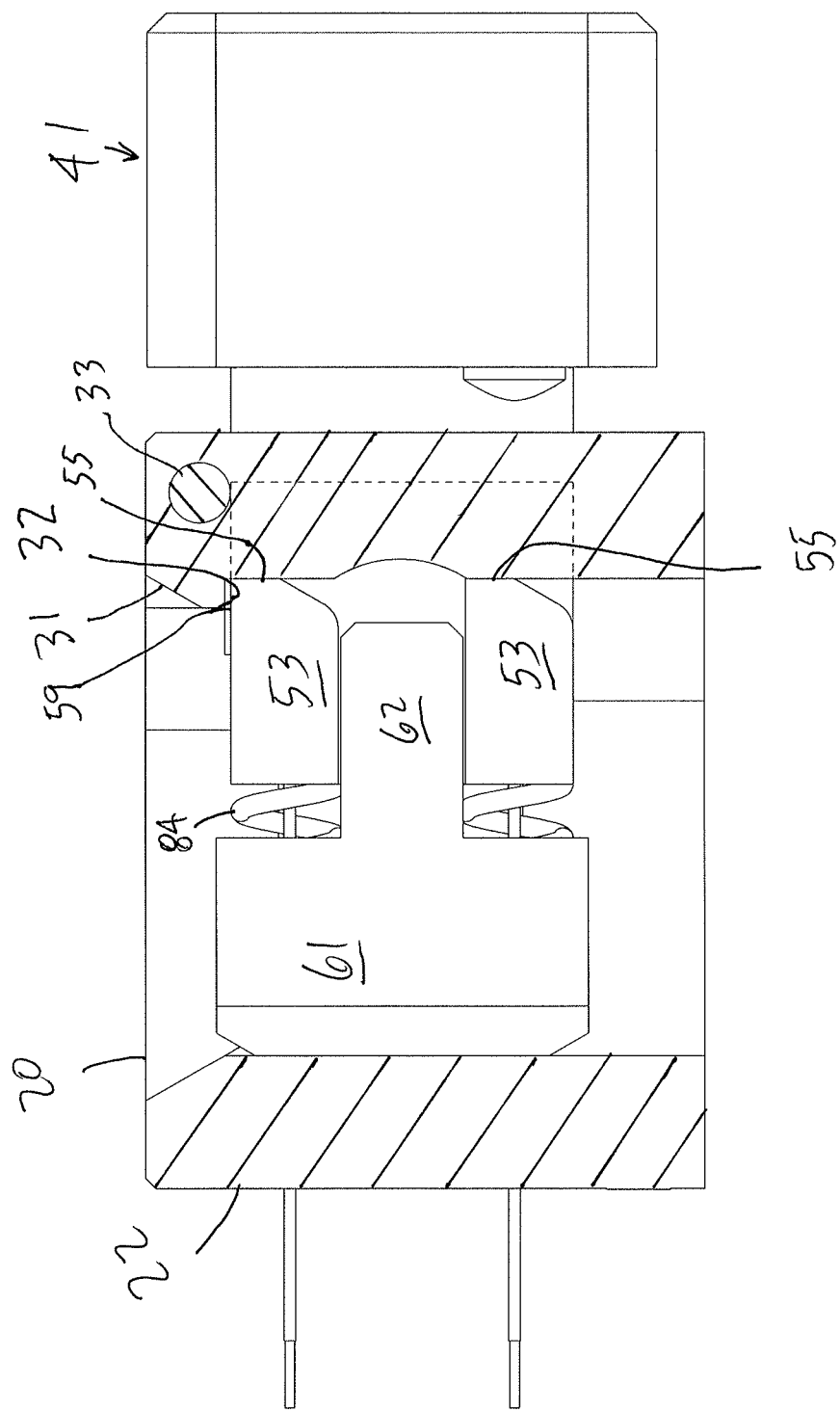
FIG. 11 is a view similar to that of FIG. 9 but with the plug ferrule carrier in an uncompressed state and locked in the housing.
Figure 15:
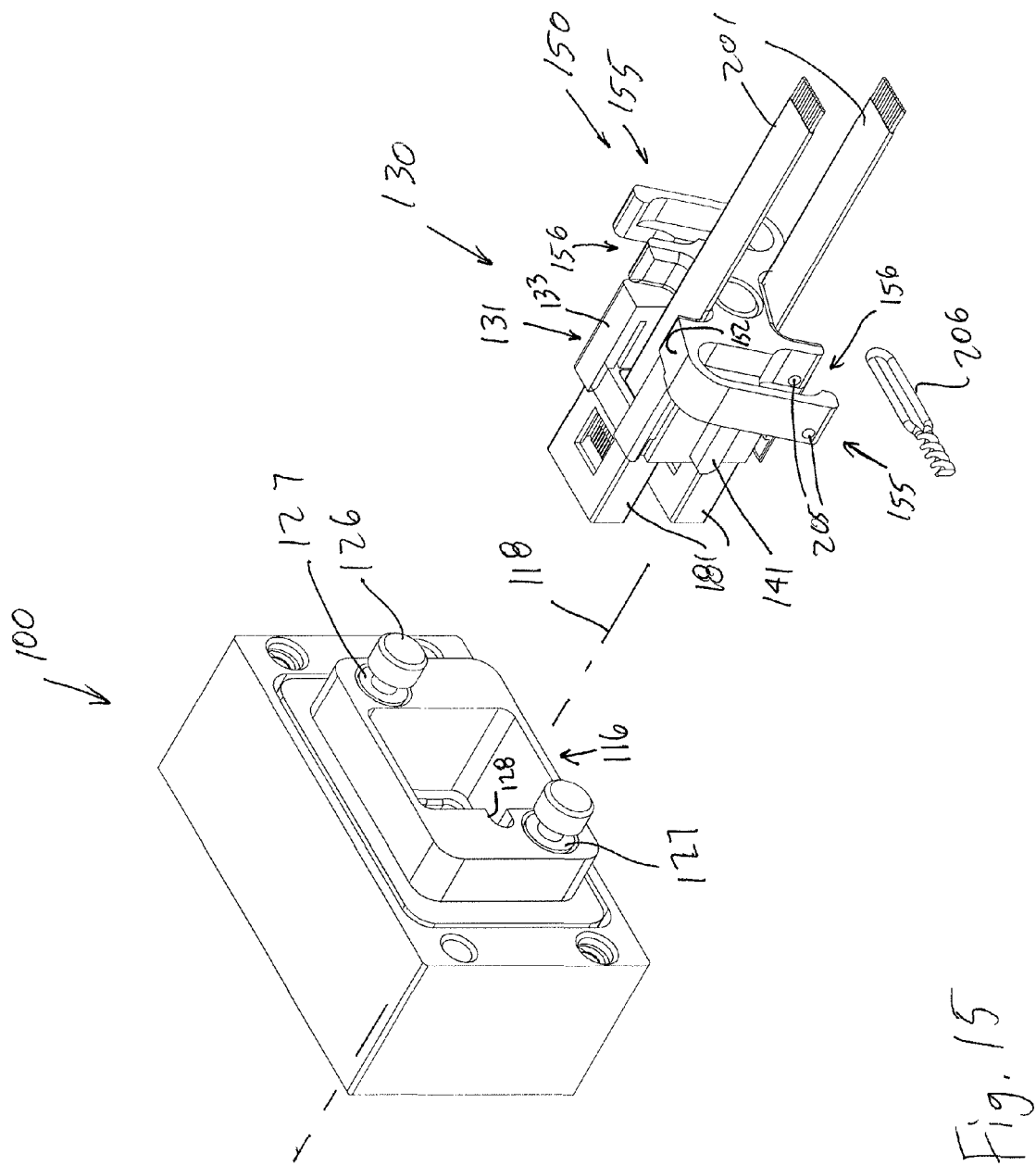
FIG. 15 is a perspective view similar to FIG. 12 but with the locking member of the ferrule rotated to the unlocked position.
Figure 17:
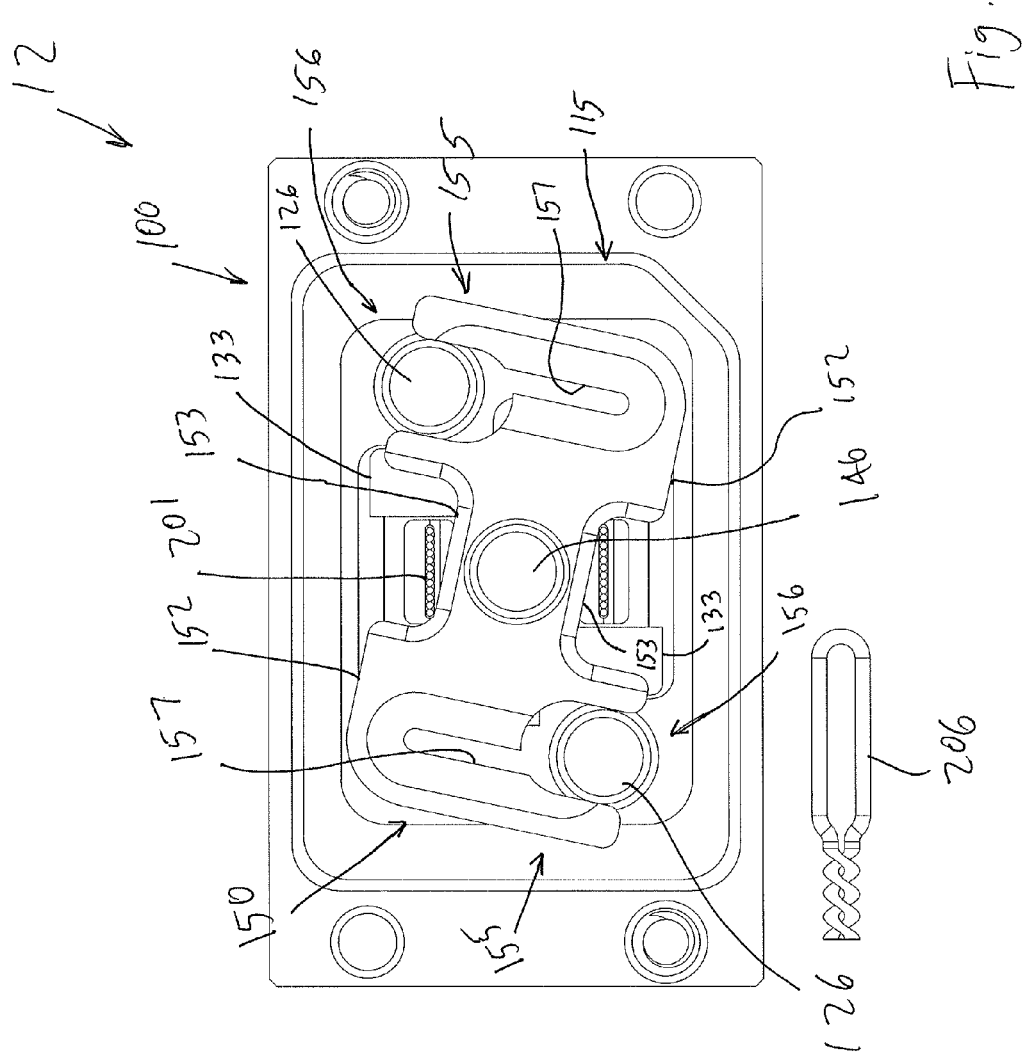
FIG. 17 is an end view of the receptacle connector assembly of FIG. 16.
Figure 18:
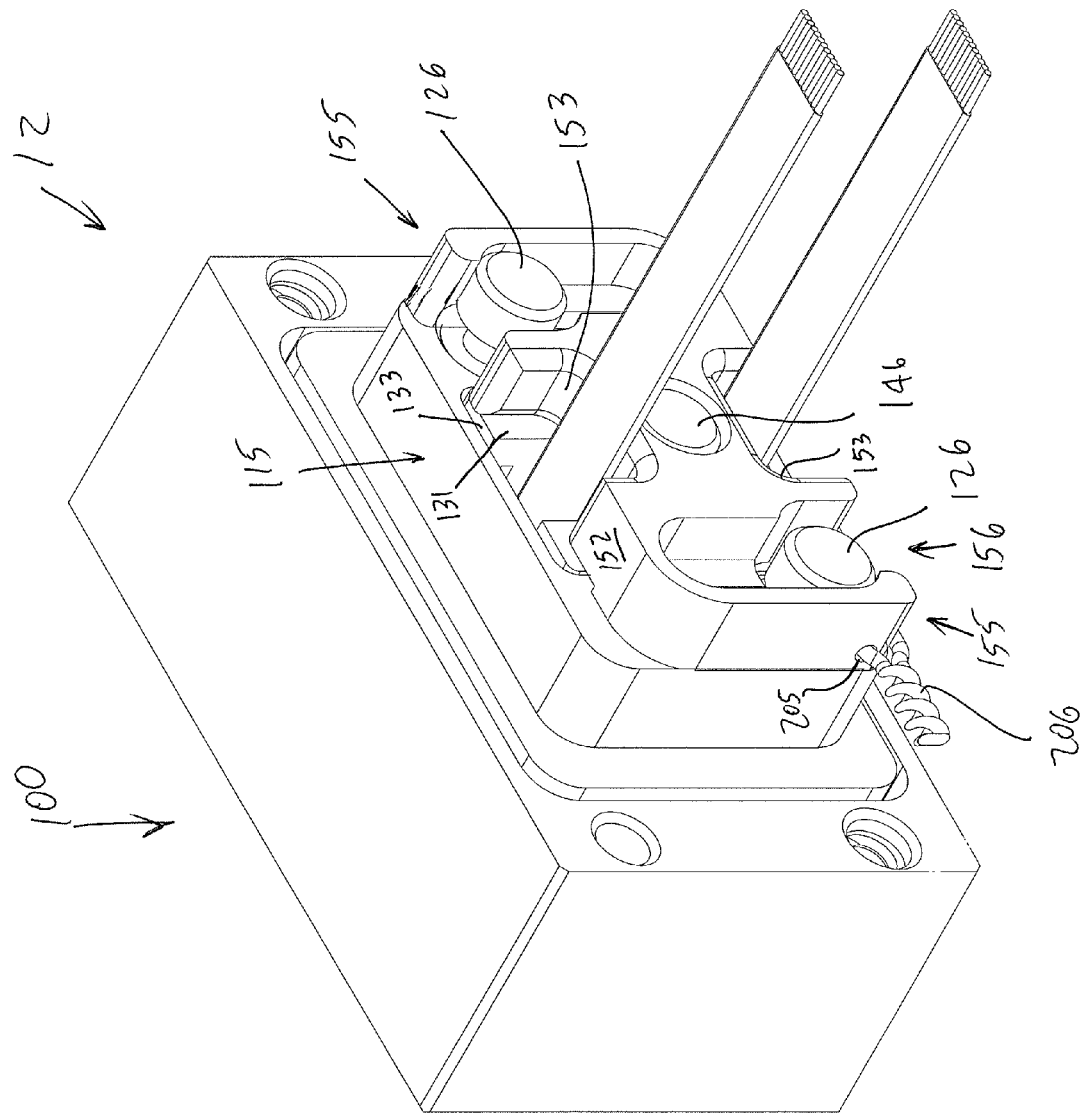
FIG. 18 is a perspective view similar to that of FIG. 16 but with the locking member rotated to the locked position.
Figure 19:
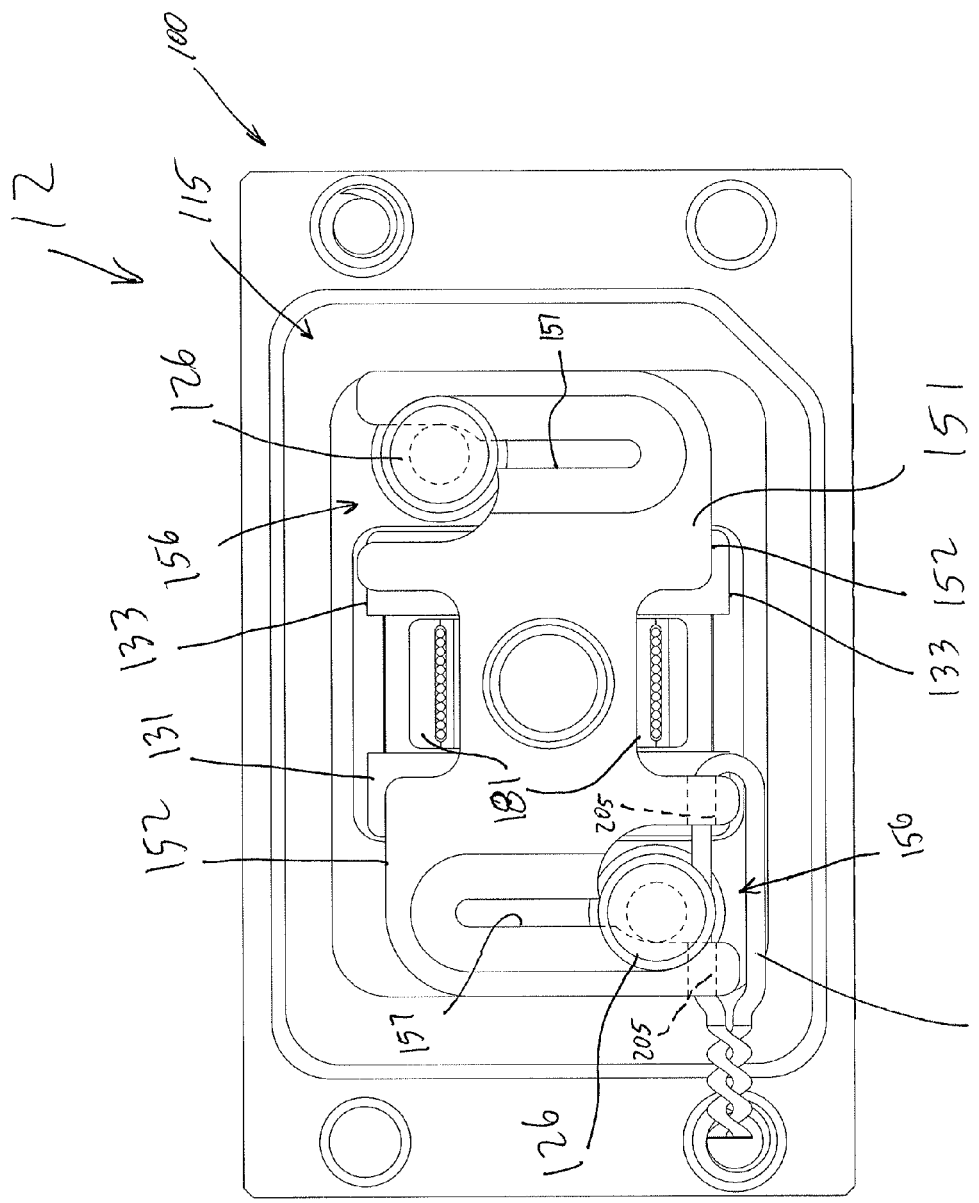
FIG. 19 is an end view of the receptacle connector assembly of FIG. 18.

Referring to FIGS. 15-9, the process for inserting and locking receptacle ferrule carrier 130 within receptacle housing 100 is depicted. Ferrule carrier 130 is first aligned with ferrule carrier receptacle 116 so that the ferrules 181 are aligned with apertures 120 in the housing insert 115 and polarization rib 141 of the ferrule carrier 130 and is aligned with the polarization slot 128 of the ferrule carrier receptacle 116. The receptacle locking member 151 is pivoted or rotated slightly so that the upper and lower surfaces 152 thereof are at an angle to the upper and lower surfaces 133 of the ferrule retaining portion 131 as best seen in FIGS. 15 and 17.

Figure 16:
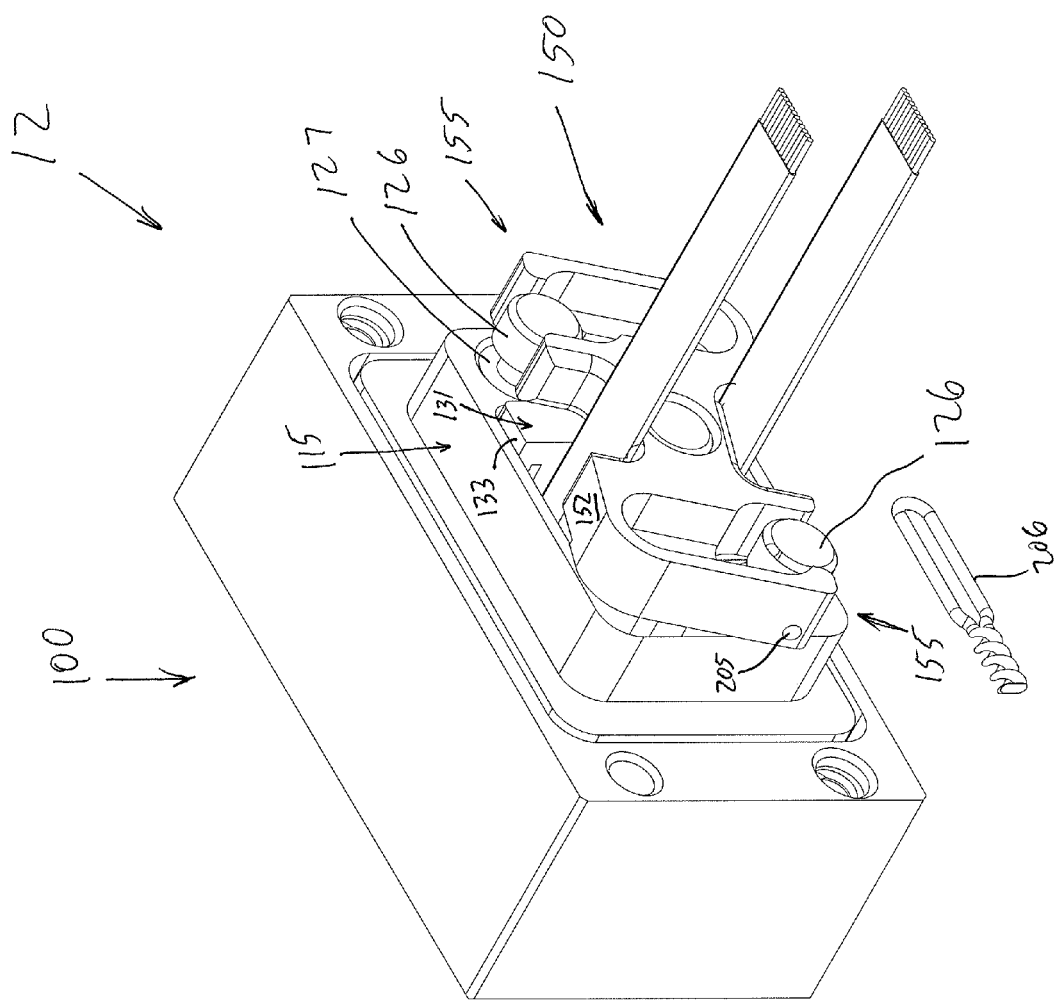
FIG. 16 is a perspective view similar to that of FIG. 15 but with the receptacle ferrule carrier inserted into the receptacle housing.

The ferrule carrier 130 is then moved into the ferrule carrier receiving receptacle 116 as depicted in FIG. 16. Once the ferrule carrier 130 is fully inserted and the inlet 156 of each locking section 155 is adjacent one of the annular recesses 127 of the alignment and locking pins 124, a force is applied to the locking member 151 to rotate the locking member relative to the pins. The force is sufficient to deflect the locking arms 160 and permit the locking section 155 of the locking member 151 to lockingly engage the annular recesses 127.

Through such a configuration, the receptacle ferrule carrier 130 may be manually inserted into and locked within the ferrule carrier receptacle 116 of housing insert 115 without the use of tools. The ferrule carrier receptacle 116 opens away from the backplane 16 so that the position of other components on the backplane is unlikely to affect the ability of an operator to insert the receptacle ferrule carrier 130 into the housing insert 115. After the receptacle interconnect assembly 12 is mounted on backplane 16, the receptacle ferrule carrier 130 may be easily removed without removing the receptacle housing 100 from the backplane 16. This may be desirable so that the ends of the optical fibers 200 may be cleaned or the ferrules 181 replaced.

If desired, structure may be added to either or both of plug interconnect assembly 11 and receptacle interconnect assembly 12 to ensure that their respective ferrule carriers are fully inserted into its receptacle and may not be accidently removed. Such a structure is depicted with respect to the receptacle interconnect assembly 12. More specifically, holes 205 may be provided in one of the locking sections 155 at the outer edge of the inlet 156 of the locking member 151 and dimensioned to receive a wire therein. After the locking member 151 is locked onto the annular recesses 127 of the alignment and locking pins 124, a safety wire 206 may be inserted within the holes 205 in the locking sections 155 at the outer edge of the inlet 156 and then formed or twisted upon itself. It should be noted that the wire 206 is depicted in the Figures as already twisted even when spaced from the holes 205.

The components of plug interconnect assembly 11 and receptacle interconnect assembly 12 may be formed of any material that will meet the desired strength and weight characteristics. In one embodiment, the plug interconnect assembly 11 and receptacle interconnect assembly 12 may be made of metal such as aluminum. In other embodiments, some or all of the components of the plug interconnect assembly 11 and receptacle interconnect assembly 12 may be formed of other materials such as steel, resin or ceramic. Other materials are also contemplated.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber connector assembly for mounting on a substrate, the optical fiber connector comprising:

a housing, the housing including a substrate mounting face and a ferrule carrier receptacle, the substrate mounting face defining a mounting plane, the ferrule carrier receptacle opening in a direction generally perpendicular to the mounting plane and defining a ferrule carrier insertion axis along which a ferrule carrier may be inserted, the ferrule carrier receptacle having an opening with a first length along a first direction;

a multi-fiber ferrule, the multi-fiber ferrule including a plurality of bores, each bore being configured to receive an optical fiber therein, one of the bores defining an optical fiber axis; and a ferrule carrier, the ferrule carrier being positioned within the ferrule carrier receptacle and including a ferrule receiving receptacle with the multi-fiber ferrule therein, the ferrule carrier including a locking portion for locking the ferrule carrier within the ferrule carrier receptacle and a locking member movable generally parallel to the optical fiber axis, the locking member being movable between a first insertion position and a second locked position, the locking portion having a compressed length along the first direction with the locking member at the first insertion position and a locked length in the first direction with the locking member at the second locked position, the compressed length being less than the first length and the locked length being greater than the first length;

wherein the optical fiber axis is parallel to the mounting plane.

2. The optical fiber connector assembly of claim 1, wherein at least one of the housing and the ferrule carrier are formed of metal.

3. The optical fiber connector assembly of claim 1, further including a locking member for locking the ferrule carrier within the ferrule carrier receptacle.

4. The optical fiber connector assembly of claim 3, wherein the locking member is movable between a first position, at which the ferrule carrier is insertable into the ferrule carrier receptacle along the ferrule carrier insertion axis, and a second position, at which the ferrule carrier is locked within the ferrule carrier receptacle.

5. The optical fiber connector assembly of claim 3, wherein the locking member is movable generally parallel to the optical fiber axis.

6. The optical fiber connector assembly of claim 1, wherein the ferrule carrier further includes a ferrule retaining portion, the locking portion including a body portion integrally formed with the ferrule retaining portion.

7. The optical fiber connector assembly of claim 6, further including a biasing member to bias the locking member away from the body portion.

8. The optical fiber connector assembly of claim 1, wherein the ferrule carrier further includes a pair of spaced apart ferrule receiving receptacles with a multi-fiber ferrule positioned in each ferrule receiving receptacle.

9. An optical fiber connector assembly for mounting on a substrate, the optical fiber connector assembly comprising:

a housing, the housing including a substrate mounting face and ferrule carrier receptacle, the substrate mounting face defining a mounting plane, the ferrule carrier receptacle opening in a direction generally perpendicular to the mounting plane and defining a ferrule carrier insertion axis along which a ferrule carrier may be inserted;

a multi-fiber ferrule, the multi-fiber ferrule including a plurality of bores, each bore being configured to receive an optical fiber therein, one of the bores defining an optical fiber axis;

a ferrule carrier positioned within the ferrule carrier receptacle, the ferrule carrier including a ferrule receiving receptacle with the multi-fiber ferrule therein, the optical fiber axis being perpendicular to the mounting plane; and a locking member for locking the ferrule carrier within the ferrule carrier receptacle, the locking member being rotatable relative to the optical fiber axis.

10. The optical fiber connector assembly of claim 9, wherein the locking member is rotatable between a first position, at which the ferrule carrier is insertable into the ferrule carrier receptacle along the ferrule carrier insertion axis, and a second position, at which the ferrule carrier is locked within the ferrule carrier receptacle.

11. The optical fiber connector assembly of claim 9, wherein at least one of the housing and the ferrule carrier are formed of metal.

12. The optical fiber connector assembly of claim 9, wherein the locking member is a portion of the ferrule carrier.

13. The optical fiber connector assembly of claim 9, wherein the ferrule carrier further includes a pair of spaced apart ferrule receiving receptacles with a multi-fiber ferrule positioned in each ferrule receiving receptacle.

14. The optical fiber connector assembly of claim 13, wherein the locking member pivots about an axis between the pair of spaced apart ferrule receiving.

15. The optical fiber connector assembly of claim 9, wherein the locking member includes a deflectable locking arm that engages a locking post to lock the ferrule carrier to the housing.

16. The optical fiber connector assembly of claim 9, wherein the housing further includes a pair of locking posts, and the locking member is a portion of the ferrule carrier, the locking member including a pair of oppositely facing locking arms that each engage one of the locking posts to lock the ferrule carrier to housing.

17. An optical fiber connector assembly for mounting on a substrate, the optical fiber connector assembly comprising:

a metal housing, the metal housing including a substrate mounting face and ferrule carrier receptacle, the substrate mounting face defining a mounting plane, the ferrule carrier receptacle opening in a direction generally perpendicular to the mounting plane and defining a ferrule carrier insertion axis along which a ferrule carrier may be inserted;

a pair of multi-fiber ferrules, each multi-fiber ferrule including a plurality of bores, each bore being configured to receive an optical fiber therein, one of the optical fibers defining an optical fiber axis;

a metal ferrule carrier, the metal ferrule carrier being positioned within the ferrule carrier receptacle and including a pair of spaced apart ferrule receiving receptacles with one of the multi-fiber ferrules within each receptacle, the ferrule carrier further includes a ferrule retaining portion and a locking portion for locking the ferrule carrier within the ferrule carrier receptacle, the locking portion including a body portion integrally formed with the ferrule retaining portion and a locking member, the locking member being movable generally parallel to the optical fiber axis; and a locking member for locking the ferrule carrier within the ferrule carrier receptacle.

18. The optical fiber connector assembly of claim 17, wherein one of the optical fibers defines an optical fiber axis, and the locking member is rotatable relative to the optical fiber axis.

* * * * *